Figure 1:
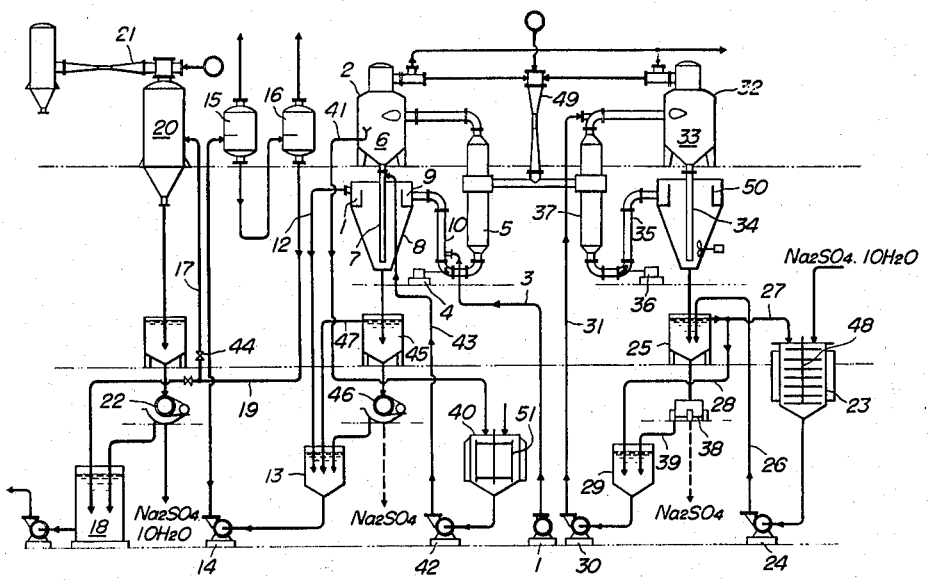

June 21, 1966

SHIRO NAKAI 3,257,176

PROCESS FOR RECOVERING SULFURIC ACID AND
ANHYDROUS SODIUM SULFATE

Filed April 4, 1962

3,257,176
PROCESS FOR RECOVERING SULFURIC ACID AND ANHYDROUS SODIUM SULFATE

Shiro Nakai, Ikeda-shi, Japan, assignor to Kimura Entetsu Kagaku Kikai Co., Ltd., Amagasaki-shi, Japan, a corporation of Japan
Filed Apr. 4, 1962, Ser. No. 185,128
2 Claims. (Cl. 23—301)

This invention relates to a process for recovering acid, and more particularly to an improved and useful process for recovering sulfuric acid and anhydrous sodium sulfate from waste spin bath acid in the viscose process for manufacturing rayons.

In the viscose process, sulfuric acid in the spin bath is consumed by reaction with caustic soda contained in the viscose and at the same time diluted with water produced by the reaction. In order to revive the waste spin bath acid and reuse it, it has been common practice to evaporate water from the waste spin bath acid and crystallize by cooling and separate sodium sulfate in the bath as Glauber's salt, recovering sulfuric acid and zinc sulfate, etc. at the same time.

This conventional process may be advantageous in that most of water to be evaporated is evaporated by heating so as to recover sulfuric acid. It has, however, a counterbalancing disadvantage in that the recovered sodium sulfate is hydrous and lower-priced than the spent sulfuric acid and caustic soda. If the hydrous sodium sulfate is dehydrated to produce higher-priced anhydrous sodium sulfate, the additional installation and operation cost is very high and the investment is far from being covered by the small profit which anhydrous sodium sulfate obtained will bring.

The above and other disadvantages of the conventional process are completely and economically overcome by the process of the present invention.

The present invention consists of a process for recovering acid solution of a higher $H_2SO_4$ concentration and anhydrous sodium sulfate from the waste spin bath acid in the viscose process by evaporating therefrom water formed by reactions during the coagulate process and separating sodium sulfate therefrom as crystals of anhydrous sodium sulfate. The process of the invention includes the step of separating from the waste spin bath acid part of sodium sulfate as crystals of hydrous sodium sulfate, the step of dehydrating the hydrous sodium sulfate, the step of concentrating the waste acid solution from the spin bath by evaporation of its water component so as to prepare a supersaturated solution of sodium sulfate, and the step of adding crystals of anhydrous sodium sulfate to the supersaturated solution so that the added crystals may grow on the excess sodium sulfate contained in the supersaturated solution or the addition may touch off a formation and growth of crystals of anhydrous sodium sulfate in the solution.

To enlarge the above description, the process of the present invention is carried out in the following way:

One-fifth to one-tenth of the amount of sodium sulfate existing in the waste spin bath acid is crystallized by cooling and separated as hydrous sodium sulfate from the bath. The hydrous sodium sulfate is then dehydrated to produce crystals of anhydrous sodium sulfate by evaporating their water or crystallization by the evaporation method which requires little heating energy. On the other hand, a waste acid solution from the spin bath, from which is first evaporated part of water produced by the reactions, is then concentrated by further evaporation to prepare a metastable supersaturated solution of sodium sulfate, which is continuously charged into a crystallizer to fill it. To this supersaturated solution of sodium sulfate in the crystallizer is added a slurry that has been prepared by mixing part of the supersaturated solution with the crystals of anhydrous sodium sulfate previously obtained by the above-mentioned step of the process of the invention or from other sources. The slurry may be added all at once or divided into parts for separate addition. The addition of the slurry to the metastable supersaturated solution in the crystallizer will result in the growth of the crystals of anhydrous sodium sulfate in the slurry feeding on the excess sodium sulfate in the metastable supersaturated solution. The crystals of anhydrous sodium sulfate thus formed are taken out from the bottom of the crystallizer as a suitable slurry so as to be separated from the concentrated waste acid solution.

The amount of anhydrous sodium sulfate thus obtained is enough to cover the amount to have been spent in preparing the slurry and may be used in a subsequent preparation of such slurry.

Thus, according to this invention, an acid solution of a high $H_2SO_4$ concentration and crystals of anhydrous sodium sulfate may simultaneously be recovered from a waste spin bath acid in the viscose process.

The process of the present invention has the following advantages worthy of special mention over the conventional one: that a higher $H_2SO_4$ concentration is obtained by the process of the invention than by the conventional one, with simultaneous recovery of high-priced anhydrous sodium sulfate; that sodium sulfate is recovered directly as anhydrous sodium sulfate without going through the intermediate stage of hydrous sodium sulfate, with the result that because less waste acid solution need be treated in the present process than in the conventional one, the less steam is necessary for its evaporation; and that the installation and operation cost for the process of the invention is much less than that for the conventional process.

It is an object of the present invention to provide an improved and useful process for recovering acid and anhydrous sodium sulfate from waste spin bath acid in the viscose process.

Another object of the invention is to provide an improved and useful process for recoving acid solution of a higher $H_2SO_4$ concentration from the waste spin bath acid.

Another object of the invention is to provide an improved and useful process for recovering sodium sulfate as not hydrous but anhydrous from the waste spin bath acid.

Still another object of the invention is to provide an improved and useful process for recovering acid and anhydrous sodium sulfate from the waste spin bath acid, which is more efficiently and economically carried out than the conventional process.

Figure 2:
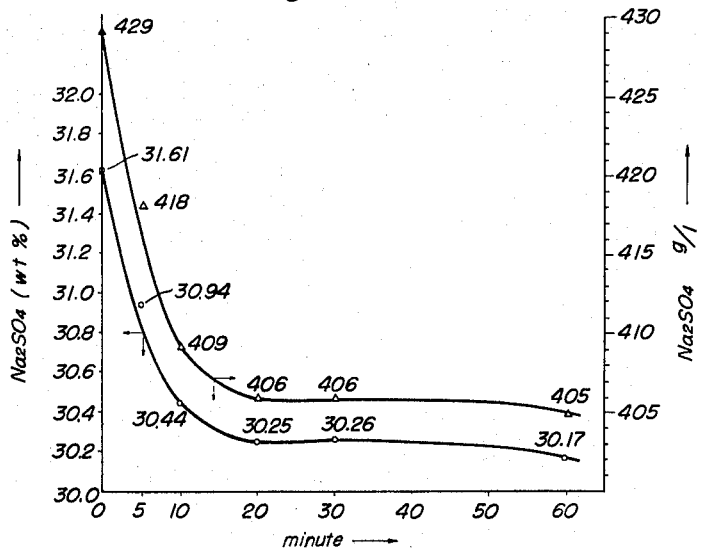

These and other objects of the invention will be more apparent from the following detailed description with reference to the accompanying drawings wherein;

FIG. 1 shows a flow sheet of an apparatus for carrying out the process of the invention; and FIG. 2 shows a graph illustrating the changes in the concentration of a supersaturated solution of sodium sulfate corresponding to the growth of crystals of anhydrous sodium sulfate in the solution.

In the following description, an example of the process of the invention is explained as being carried out in a plant having a daily output of 20 tons of staple fibre.

There is shown in FIG. 1 a pump 1 which is connected through a conduit 3 to a suitable evaporator, generally indicated as 2, such as of a vapor recompression type. The evaporator referred to is supposed to be of a vapor recompression type of vacuum evaporator with degasser having an effective steam efficiency of more than 230%.

Now, 24,540 kg./h. of waste acid solution having a temperature of about 48° C. is withdrawn by the pump 1 from a spin bath (not shown) to be sent through the conduit 3 to the evaporator 2, where the solution is charged by means of a forced-circulation pump 4 into a heat exchanger 5 to be heated therein, so that a maximum of 3,340 kg./h. of water is evaporated from the solution in the evaporating chamber 6 by means of heating steam supplied. The concentrated solution is then poured down into a crystallizer 8 through a down-take pipe 7.

The waste acid solution, when withdrawn from the spin bath, contains:

| | Wt. percent |
|---|---|
| $H_2SO_4$ | 7.02 |
| $ZnSO_4$ | 1.04 |
| $Na_2SO_4$ | 27.35 |

(48° C. $Na_2SO_4$ 363 g./l.)

In the evaporator 2 the solution boils at a boiling point of 68° C. and is concentrated by evaporation so as to contain:

| | Wt. percent |
|---|---|
| $H_2SO_4$ | 8.125 |
| $ZnSO_4$ | 1.025 |
| $Na_2SO_4$ | 31.61 |

The concentrated solution thus obtained is continuously poured down from the evaporator 2 into the crystallizer 8 connected thereto by the down-take pipe 7.

The concentrated solution in the crystallizer 8, when a supersaturated slurry containing crystals of anhydrous sodium sulfate is added to it as will be explained in detail later, discharges the excess of sodium sulfate so that the added crystals may grow on the excess sodium sulfate. The solution, of which the excess sodium sulfate has been fed on by the added crystals for their growth, overflows as a saturated solution from the upper outlets 9, 11 of the crystallizer 8. The overflowing solution contains:

| | Wt. percent |
|---|---|
| $H_2SO_4$ | 8.26 |
| $ZnSO_4$ | 1.225 |
| $Na_2SO_4$ | 30.44 | and the amount of the excess sodium sulfate which separates from the solution as crystals of anhydrous sodium sulfate is 365.8 kg./h. This amount is 4/5 of that of the increased amount by coagulate process of sodium sulfate contained in the waste spin bath acid and separated as crystals of hydrous sodium sulfate by the conventional process. All increased amount of sodium sulfate is recovered in the above step if the previous step was not taken of withdrawing part of the sodium sulfate from the waste spin bath acid to dehydrate it for use in preparing slurry.

Part of the saturated solution overflowing from the outlet 9 is introduced by the forced-circulation pump 4 into the heat exchanger 5 through a pipe 10 to be repeatedly heated and evaporated therein, while the other part of the solution overflowing from the outlet 11 is transferred through a conduit 12 to a storage tank 13 provided outside the system.

20,843 kg./h. of the solution stored in the tank 13 is introduced by a pump 14 first into an expansion vessel 15 so as to self-evaporate therein with a drop in its temperature down to 58° C., and then into a self-evaporation vessel 16 in which the solution further self-evaporate cooling itself down to 48° C. Of the solution thus concentrated and cooled down, about 1,000 kg./h. is sent to a vacuum crystallizer 20 through a conduit 17 by adjusting a valve 44, while the other part of the solution in an amount of about 19,284 kg./h. is led through a conduit 19 to a storage tank 18 intended for recovered acid solution.

Now returning to the evaporator 2, which may be operated with a vacuum of about 590 mm. mercury column in it, about 2,260 kg./h. of compressing steam jet having a temperature of 150° C. and a gauge pressure of 3 kg./cm.² is discharged within a steam ejector 49 so as to suck 1,740 kg./h. of water vapor from the evaporator 2 and 70 kg./h. of water vapor from the evaporator 33. At this time, due to the steam jet discharged in the ejector the vapor sucked from the evaporators is compressed and heated from 63° C. to 77° C., the vacuum decreasing from 590 to 445 mm. simultaneously. Thus, a sum of 4,070 kg./h. of steam is resulted, of which 3,920 kg./h. is supplied to the heat exchanger 5 of the evaporator 2 so as to evaporate 3,340 kg./h. of water from the solution therein, and the remaining 150 kg./h. to the heat exchanger 37 of the evaporator 32 so as to vaporize 126 kg./h. of water from the solution therein. Accordingly, the amount of water evaporated from the solution in the evaporators 2 and 32 sums to 3,466 kg./h. Of that amount of steam 1,810 kg./h. is sucked into the steam ejector by the steam jet, as mentioned above, so as to be used as part of heating energy in subsequent evaporation of the solution in the evaporators 2 and 32. In short, the amount evaporated from the evaporators is 3,466 kg./h., while the amount to be sucked therefrom by the steam jet for use in subsequent evaporation is 1,810 kg./h. Accordingly, 1,656 kg./h. of steam (that is, 3,466 kg./h. minus 1,810 kg./h.) which is not sucked by the steam jet, as well as about 560 kg./h. of extra-steam from the vessels 15, 16, may be used for other purposes, for example, serving as a source of energy capable of evaporating about 1,880 kg./h. of water. Thus, the steam efficiency of the evaporator 2 is over 230%, which is the highest of all the conventional ones.

It will be understood from the foregoing that in order to dehydrate hydrous sodium sulfate, the process according to the present invention requires no other supply sources of stream than the step of recovering acid. Therefore, the installation and operation cost for dehydrating hydrous sodium sulfate is much smaller with the process of the present invention than with the conventional one, wherein about 4 times as much of hydrous sodium sulfate needs to be treated for dehydration. This is one of the advantages the method of the invention has over the conventional one. Another advantage of the present invention is that a solution of a higher $H_2SO_4$ concentration may be recovered. These and other advantages of the invention will not be offset by a small installation and operation cost for providing the existing plant with a crystallizer, a small-scale dehydration unit or so necessary to carry out the process of the invention.

As previously referred to, in order to continuously obtain crystals of anhydrous sodium sulfate to be continuously charged into the crystallizer, a suitable amount of waste acid solution may be treated for concentration in a small-scale vacuum cooling crystallizer to produce hydrous sodium sulfate, which is then dehydrated. The treatment may follow the below example. In the vacuum crystallizer 20, about 130 kg./h. of compressing steam jet having a gauge pressure of 3 kg./cm.² and a temperature of 150° C. is passed through the vacuum-generating steam ejector 21 so as to produce and maintain a vacuum in the crystallizer. By this the waste acid solution introduced thereinto is cooled down to 20° C., depositing 216.4 kg./h. of crystals of hydrous sodium sulfate, which is then separated by a vacuum filter 22 for dehydration, the remaining mother liquor in an amount of about 750 kg./h. being delivered to the storage tank 18 for recovered solution. Coarse-grained crystals of anhydrous sodium sulfate thus obtained will be charged into the crystallizer 8 as above mentioned.

As described hereinbefore, the solution that comes out of the self-evaporation vessel 16 in an amount of about 20,284 kg./h. is divided into two parts, one of which in an amount of 19,284 kg./h. is sent directly to the storage tank 18, while the other part in an amount of about 1,000 kg./h. is delivered to the vacuum crystallizer 20 to be treated therein in the manner just above mentioned. The solution to be delivered to the crystallizer 20, as well as the solution to be sent to the storage tank 18, has a temperature of 48° C. and contains:

| | Wt. percent |
|---|---|
| $H_2SO_4$ | 8.49 |
| $ZnSO_4$ | 1.259 |
| $Na_2SO_4$ | 31.30 |

After being treated in the crystallizer 20, the solution is cooled down to about 20° C. and with part of sodium sulfate having been separated therefrom as crystals of hydrous sodium sulfate as mentioned above, the solution comes to contain:

| | Wt. percent |
|---|---|
| $H_2SO_4$ | 11.33 |
| $ZnSO_4$ | 1.68 |
| $Na_2SO_4$ | 28.65 |

Then, according to the process of the invention, the solution of this composition in an amount of about 750 kg./h. is sent to the storage tank 18 where it is mixed with the solution of the former composition in an amount of about 19,284 kg./h., so that about 20,034 kg./h. of recovered acid solution of the following composition is obtained:

| | Wt. percent |
|---|---|
| $H_2SO_4$ | 8.59 |
| $ZnSO_4$ | 1.271 |
| $Na_2SO_4$ | 31.2 |

In the conventional process, when 60,000 kg./h. of waste acid solution is treated to evaporate 6,000 kg./h. of water therefrom, with an additional amount of about 636 kg./h. of water which is consumed as water of crystallization to produce hydrous sodium sulfate, about 52,756 kg./h. of acid solution of the following composition may be recovered:

| | Wt. percent |
|---|---|
| $H_2SO_4$ | 8.0 |
| $ZnSO_4$ | 1.18 |
| $Na_2SO_4$ | 30.2 |

Now, according to the process of the present invention, 24,540 kg./h. out of 60,000 kg./h. of waste acid solution is treated, so as to evaporate 3,340 kg./h. of water by the evaporator 2 and self-evaporate about 560 kg./h. of water in the vessels 15, 16, and 27,260 kg./h. of the remaining 35,460 kg./h. of the waste acid solution is treated in a different evaporator so that 2,726 kg./h. of water is evaporated therefrom, much the same amount of water has been removed from the same amount (60,000 kg./h.) of waste acid solution as is the case with the conventional process. Therefore, if 20,034 kg./h. of the recovered acid solution of the $H_2SO_4$ concentration of 8.59 wt. percent is diluted with about 12,000 kg./h. of untreated waste acid solution of a 7.02 $H_2SO_4$ concentration, 32,034 kg./h. of acid solution may be obtained containing:

| | Wt. percent |
|---|---|
| $H_2SO_4$ | 8.0 |
| $ZnSO_4$ | 1.19 |
| $Na_2SO_4$ | 29.8 |

The composition is much the same as that of the recovered acid solution $H_2SO_4$ 8.0 wt. percent by the conventional process. Accordingly, in the process of the present invention about 20,200 kg./h. of waste acid solution which would otherwise have been treated need not be charged into the evaporator, and the equipment and energy necessary for the treatment of the amount of the solution may be utilized for other purposes.

About 216.4 kg./h. of hydrous sodium sulfate separated in the above-mentioned way from the mother liquor by the vacuum filter 22 is then charged into a dissolving tank 23 annexed to the dehydration unit. In the conventional process, 1,082 kg./h. of hydrous sodium sulfate needs to be dehydrated by evaporation, whereas the process of the invention requires only ⅕ to 1/10 as much of it to be dehydrated. This means that the process of the invention demands a smaller installation and operation cost for the vacuum-generating steam ejector 21 of the vacuum crystallizer 20 than the conventional process, even though anhydrous sodium sulfate to be continuously charged into the crystallizer has to be produced within the plant due to lack of other suitable supply sources of it. What is more advantageous, the cooling temperature is 20° C. in the former, while in the latter it is 12° to 17° C. The amount of steam jet necessary for the conventional process to crystallize 1,000 kg./h. of hydrous sodium sulfate is about 300 kg./h., while the process of this invention demands only less than ⅓ of it, with the result that a filter having a capacity lower than the conventional one is enough for the present purpose. According to the invention, about 6.2 t./day and more than 2,245 t./year of steam and more than 30,000 t./year of industrial water may be economized.

If the existing vacuum crystallizer having a capacity of producing 5 times as much hydrous sodium sulfate as is required by the process of the invention is used, ⅘ of its capacity becomes idle. The idle portion of the equipment, however, may be converted to a cooling apparatus which may cool down industrial water used in heat exchange from about 38° C. to 18° C., thereby saving more than 5,000 l./h. of industrial water.

The hydrous sodium sulfate that has been charged into the dissolving tank 23 is dissolved therein at 45° C. by the heat of solution supplied by extra steam conveyed thereto through suitable drain pipes (not shown) from either or both of the respective heat exchanger 5, 37 of the evaporators 2, 32. The resultant solution in the tank 23 is transferred by a pump 24 through a conduit 26 to a storage tank 25, from which supernatant portion of the solution is returned to the tank 23 by a conduit 27.

In the dissolving tank 23 there will be formed crystals of anhydrous sodium sulfate of an 11% $Na_2SO_4$ concentration. Most of the crystals thus formed are comparatively large-sized, with smaller particles of more than 200 mesh in size being less than 5%. All the crystals settle down on the bottom of the tank 23 which is provided with a suitable agitator 48 to prevent the settled crystals becoming solid. The solution containing the crystals is sent by a pump 24 from the tank 23 to another tank 25, where the crystals settle down and supernatant solution having a temperature of 45° C. is sent through a branch 28 of the conduit 27 to still another tank 29.

From the bottom of the tank 25 is withdrawn slurry containing crystals of anhydrous sodium sulfate to be sent to a centrifuge 38, where they are separated from their mother liquor which is delivered to the tank 29. The liquor in the tank 29 is then transferred by a pump 30 through the heat exchanger 37 to the evaporator 32.

In the evaporator 32, the saturated solution of sodium sulfate is concentrated by evaporation so as to contain 5 to 9 g./l. more of sodium sulfate than a saturated solution at this specific temperature may contain. This supersaturated solution is then poured down into the crystallizer 34. The formation of crystals of anhydrous sodium sulfate from the supersaturated solution is effected in the following well-known way:

Solution of sodium sulfate that has been put into the evaporator 33 is delivered by a forced-circulation pump 36 through a pipe 35 to the heat exchanger 37 to be heated therein, from where it is sent back to the evaporator 33 to be evaporated and concentrated therein, producing crystals of anhydrous sodium sulfate. Then, the concentrated solution containing the crystals enters the crystallizer 34, where the crystals grow and settle down leaving supernatant solution to be again sent to the heat exchanger 37, while slurry of anhydrous sodium sulfate is taken out from the bottom of the crystallizer 34 into the tank 25 to be mixed therein with the solution of sodium sulfate sent thereinto from the above-mentioned dissolving tank 23. The solution thus obtained as containing anhydrous sodium sulfate is then sent to the centrifuge 38, by which the crystals are separated at the ratio of about 90 kg./h. from their mother liquor, which is sent to the tank 29 through a conduit 39.

In the conventional process, sodium sulfate is separated from the waste spin bath acid first as $Na_2SO_4 \cdot 10H_2O$ as contained in hydrous sodium sulfate of the following composition:

| | Wt. percent |
|---|---|
| $H_2SO_4$ | 0.3 |
| $ZnSO_4$ | 0.05 |
| $Na_2SO_4$ | 41.12 |
| $H_2O$ | 58.53 | and then dehydrated to be $Na_2SO_4$. In this case the process of dehydration is carried out in a separate plant which is usually run independently of the process of recovering acid. This naturally requires higher installation and operation costs. In the process of the present invention, however, anhydrous sodium sulfate is obtained as a by-product of the process of recovering acid, and this may be effected by modifying the existing installation or providing it with a few additional equipments. The cost for such modification or provision is obviously less than the cost for providing a separate and independent plant. Moreover, experience has shown that about 30 t./day of steam, 1,500 t./day of water and 1,100 kwh./d. of electric power may be economized by the process of the present invention, as compared with the conventional one which requires an independent plant for dehydration of hydrous sodium sulfate.

The crystals of anhydrous sodium sulfate obtained by the above-mentioned process are continuously and regularly charged into a tank 40 for preparing slurry, which is provided with an agitator 51 and supplied with an amount of steam from the heat exchanger 5 of the evaporator 2 or the heat exchanger 37 of the evaporator 32 enough to keep the the solution contained therein at a required temperature. In the tank 40 a slurried solution of a 5 to 10% concentration is prepared from the charged crystals of anhydrous sodium sulfate and a supersaturated solution that has been sent from the evaporating chamber 6 of the evaporator 2 to the tank 40 through a conduit 41. This slurry is then withdrawn by a pump 42 from the tank 40 into the crystallizer 8 through a conduit 43 and the down-take pipe 7, so that the crystals brought there contained in the slurry grow on the supersaturated solution in the crystallizer 8.

Experiments show that about 10 minutes after the charging of crystals of anhydrous sodium sulfate approximately 10 times as much anhydrous sodium sulfate as the amount first charged has been formed in the crystallizer. Under the worst condition it is 5 times as illustrated in FIG. 2. (FIG. 2 shows a graph illustrating the changes of the $Na_2SO_4$ concentration of a supersaturated sodium sulfate solution having a specific gravity of 1.3572, a temperature of 68° C., and containing 4.49 wt. percent of $H_2SO_4$, 0.79 wt. percent of $ZnSO_4$ and 31.69 wt. percent of $Na_2SO_4$; the changes shown corresponding to the growth of crystals of anhydrous sodium sulfate feeding on the supersaturated solution, when 2 g./l. (0.1475 wt. percent of crystals of anhydrous sodium sulfate is added to the supersaturated solution. In the graph the ordinate is shown in terms of wt. percent and g./l. of $Na_2SO_4$ and the abscissa in terms of time; the upper and lower curves indicating the changes of g./l. and wt. percent, respectively.)

As described hereinbefore, of the excess $Na_2SO_4$ contained in the supersaturated solution charged into the crystallizer 8, 365.8 kg./h. is fed on by 89.2 kg./h. of anhydrous sodium sulfate added thereto so as to form 446 kg./h. of crystals of anhydrous sodium sulfate of more than 150 mesh in size. These crystals are first withdrawn from the crystallizer 8 into a receiver 45 as contained in a slurry of a 5 to 10% concentration, the supernatant portion of which is introduced into the tank 13 by a conduit 47. The remaining slurry, now concentrated up to a 15 to 20% concentration in the bottom of the receiver 45, is then taken out therefrom to a vacuum filter 46, where after treatment on the screen of the filter with a 6 g./l. NaOH solution, crystals of anhydrous sodium sulfate are separated containing less than 0.07% $H_2SO_4$ and about 7% water, but no $ZnSO_4$. The product is then dried to a standard degree by a suitable means, such as a rotary kiln, and packed for further purposes.

The following steps will add much to the advantages of the process of the present invention: Either concentration of a waste acid solution by the evaporator or addition of hydrous sodium sulfate to the solution adds about 80 kg./h. of sodium sulfate to the amount already contained in the solution so that a sum of 445.8 kg./h. of excess sodium sulfate in the solution is offered as a feed for the growth of about 21 kg./h. of anhydrous sodium sulfate obtained from a different source and about 90 kg./h. of anhydrous sodium sulfate supplied from the tank 40 to the crystallizer 8. Thus, about 557 kg./h. of anhydrous sodium sulfate may be recovered, of which about 111 kg./h. may advantageously be reserved for use in a subsequent step of preparing slurry.

An example of the process of the invention has been described hereinbefore. It is apparent that other forms embodying the idea of the invention may be employed and that modifications, alterations and changes may be made without departing the true scope and spirit thereof.

What is claimed is:

1. A method for recovering simultaneously sulfuric acid and anhydrous sodium sulfate from waste spin bath in the viscose process, comprising the steps of concentrating the waste acid at about 50 to 80° C. under a reduced pressure to produce a supersaturated solution of 30 to 32% concentration on the basis of sodium sulfate and approximately 8.5% concentration on the basis of sulfuric acid, adding crystals of anhydrous sodium sulfate to said supersaturated waste acid solution to form crystals of anhydrous sodium sulfate in the supersaturated sodium sulfate solution, and separating the crystals thus formed from the waste acid solution, thereby recovering a sulfuric acid solution of high concentration and simultaneously crystals of anhydrous sodium sulfate from the waste spin bath solution.

2. A method for recovering simultaneously sulfuric acid and anhydrous sodium sulfate from waste spin acid bath in the viscose process, comprising the steps of separating part of the sodium sulfate in the waste acid solution as hydrous sodium sulfate by cooling part of waste acid to 20° C. dehydrating said hydrous sodium sulfate to produce crystals of anhydrous sodium sulfate, concentrating the remainder of the waste acid at about 50 to 80° C. under a reduced pressure to produce a supersaturated solution having a concentration of from 30 to 32% sodium sulfate and approximately 8.5% sulfuric acid, adding crystals of said anhydrous sodium sulfate to the supersaturated solution to make the crystals of said anhydrous sodium sulfate grow in the supersaturated sodium sulfate solution of the waste acid, and separating the crystals of anhydrous sodium sulfate thus formed from said concentrated acid solution, thereby recovering a sulfuric acid solution of a high concentration and simultaneously crystals of anhydrous sodium sulfate from the waste spin bath acid.

References Cited by the Examiner

UNITED STATES PATENTS

| 1,812,310 | 6/1931 | Stockly et al. | 23—301 |
| 2,392,888 | 1/1946 | Suhr et al. | 23—301 |
| 2,459,302 | 1/1949 | Aronson | 23—301 |
| 2,640,762 | 6/1953 | Wiseman | 23—121 |

NORMAN YUDKOFF, *Primary Examiner.*

G. P. HINES, A. J. ADAMCIK, *Assistant Examiners.*